United States Patent
Chinthamani et al.

(10) Patent No.: US 8,055,851 B2
(45) Date of Patent: Nov. 8, 2011

(54) LINE SWAPPING SCHEME TO REDUCE BACK INVALIDATIONS IN A SNOOP FILTER

(75) Inventors: Meenakshisundaram R. Chinthamani, Hillsboro, OR (US); Kai Cheng, Portland, OR (US); Malcolm Mandviwalla, Hillsboro, OR (US); Bahaa Fahim, Sunnyvale, CA (US); Keith R. Pflederer, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 213 days.

(21) Appl. No.: 11/638,851

(22) Filed: Dec. 14, 2006

(65) Prior Publication Data

US 2008/0147986 A1 Jun. 19, 2008

(51) Int. Cl.
G06F 13/14 (2006.01)
(52) U.S. Cl. ........................................ 711/141
(58) Field of Classification Search .................. None
See application file for complete search history.

(56) References Cited

U.S. PATENT DOCUMENTS

| | | | |
|---|---|---|---|
| 6,018,763 A | 1/2000 | Hughes | |
| 6,857,048 B2 | 2/2005 | Rankin | |
| 6,959,364 B2 * | 10/2005 | Safranek et al. | 711/146 |
| 7,127,586 B2 | 10/2006 | Mowry | |
| 7,590,804 B2 | 9/2009 | Cheng et al. | |
| 2002/0010838 A1 | 1/2002 | Mowry | |
| 2002/0099913 A1 * | 7/2002 | Steely, Jr. | 711/122 |
| 2006/0004963 A1 * | 1/2006 | Mattina et al. | 711/130 |
| 2006/0294314 A1 | 12/2006 | Cheng | |

OTHER PUBLICATIONS

Kai Cheng et al., "Way Hint Line Replacement Algorith for a Snoop Filter", U.S. Appl. No. 11/395,123, filed Mar. 31, 2006.
Sundaram Chinthamani et al., "Partial Way Hint Line Replacement Algorithm for a Snoop Filter", Appl #: TBD, Filed: Dec. 14, 2006.
Office Action and Search Report for GB Patent Application No. GB0723332.3, mailed on Apr. 3, 2008, 7 pages.
Office Action for GB Patent Application No. GB0723332.3, mailed on Jul. 8, 2009, 2 pages.
Office Action for GB Patent Application No. GB0723332.3, mailed on Mar. 1, 2010, 2 pages.
Office Action for GB Patent Apllication No. GB0723332.3, mailed on Sep. 15, 2009, 2 pages.
Office Action for German Patent Application No. 10 2007 052 853.3, mailed on Oct. 22, 2008, 3 pages of Office Action and 2 pages of English Translation.
Office Action for German Patent Application No. 10 2007 052 853.3, mailed on Nov. 25, 2009, 4 pages of Office Action and 3 pages of English Translation.
Office Action for Korean Patent Application No. 10-2007-129626, mailed on Aug. 28, 2009, 4 pages of Office Action and 3 pages of English Translation.
Office Action for Korean Patent Application No. 10-2007-129626, mailed on Jan. 21, 2010, 2 pages of Office Action and 2 pages of English Translation.

* cited by examiner

*Primary Examiner* — Duc Doan
(74) *Attorney, Agent, or Firm* — Caven & Aghevli LLC

(57) ABSTRACT

In an embodiment, a method is provided. The method of this embodiment provides receiving a request for data from a processor of a plurality of processors, determining a cache entry location based, at least in part, on the request, storing the data in a cache corresponding to the processor at the cache entry location, and storing a coherency record corresponding to the data in an affinity corresponding to the cache.

22 Claims, 18 Drawing Sheets

LINE SWAPPING SCHEME TO REDUCE BACK INVALIDATIONS IN A SNOOP FILTER

This application is related to U.S. patent application Ser. No. 11/639,118 entitled "PARTIAL WAY HINT LINE REPLACEMENT ALGORITHM FOR A SNOOP FILTER", filed Dec. 14, 2006 with this application.

FIELD

Embodiments of this invention relate to a line swapping scheme to reduce back invalidations in a snoop filter.

BACKGROUND

The use of multiple processors or processors with multiple cores has become increasingly common as a method of increasing the computing power of new computer systems. Multiprocessor and multicore systems share system resources such as system memory and storage devices. Multiple processors or cores often access the same data in memory or storage devices and attempt to utilize this data at the same time. To accomplish this, multiprocessor and multicore systems track the use of data to maintain data coherency. One facet of maintaining data coherency in multiprocessor systems is ensuring that data cached in each processor is coherent. For example, each processor may alter data in its cache before writing it back to system memory. If another processor requests this data from system memory before the altered data is written back to memory, data coherency is lost.

A common scheme for maintaining data coherency in these systems is to use a snoop filter. To insure data coherency, a processor or core may send coherency requests, often referred to as snoops, to other processors before accessing or modifying data. The conventional snoop filter maintains a cache of data requests from each processor or core to track the contents of the cache of each processor or core. Each time a processor retrieves data from memory, a coherency record that includes a tag address for that data is stored in the snoop filter. However, the snoop filter is not aware of cache entries that have been evicted by a processor or core since it is impractical for a processor to send all cache-hit memory references to the snoop filter to maintain a perfect match between the processor's cache entries and the snoop filter entries. For example, a frequently referenced line from a processor may appear to the snoop filter to be aged since the line's activities are not exposed outside the inner cache hierarchy. In another scenario, a clean (unmodified) line in the processor's cache may be replaced by another cache miss address without the snoop filter being notified. As a result, the snoop filter may likely have many stale data entries that are no longer in use by the processor. Furthermore, to make room for new entries when a new request is received from a processor or core, the snoop filter may have to evict cache entries that may still be in use.

The cache entries that are selected to be evicted may be selected using a replacement algorithm. One replacement algorithm of the snoop filter randomly chooses an entry in the snoop filter cache to be evicted to make room for the new entry. This causes a back invalidation message to be sent to the processor or core for the evicted entry. However, if the evicted entry is still being used by the processor or core, the processor or core will need to request the corresponding data from system memory again. This generates additional traffic on the bus between processor or core and the hub controller, thereby reducing the available bandwidth for other data transfers.

To minimize the effect of this process on the bandwidth of the bus and the utilization of the processor, the snoop filter caches are typically large enough to track several times the combined sizes of all the caches in the processors covered by the snoop filter. In practice, the snoop filter may be four to eight times larger than the total size of the caches of the processors or cores in the system. These large snoop filters occupy a large amount of space and increase the complexity and consequently the cost of hub controllers. Consequently, selecting a good replacement policy is preferable over increasing the snoop filter size. Also, improvements to the issuance of back invalidations are also desired.

BRIEF DESCRIPTION OF THE DRAWINGS

Embodiments of the invention are illustrated by way of example and not by way of limitation in the figures of the accompanying drawings in which like references indicate similar elements. It should be noted that different references to "an" or "one" embodiment in this disclosure are not necessarily to the same embodiment, and such references mean at least one.

DETAILED DESCRIPTION

Figure 1:
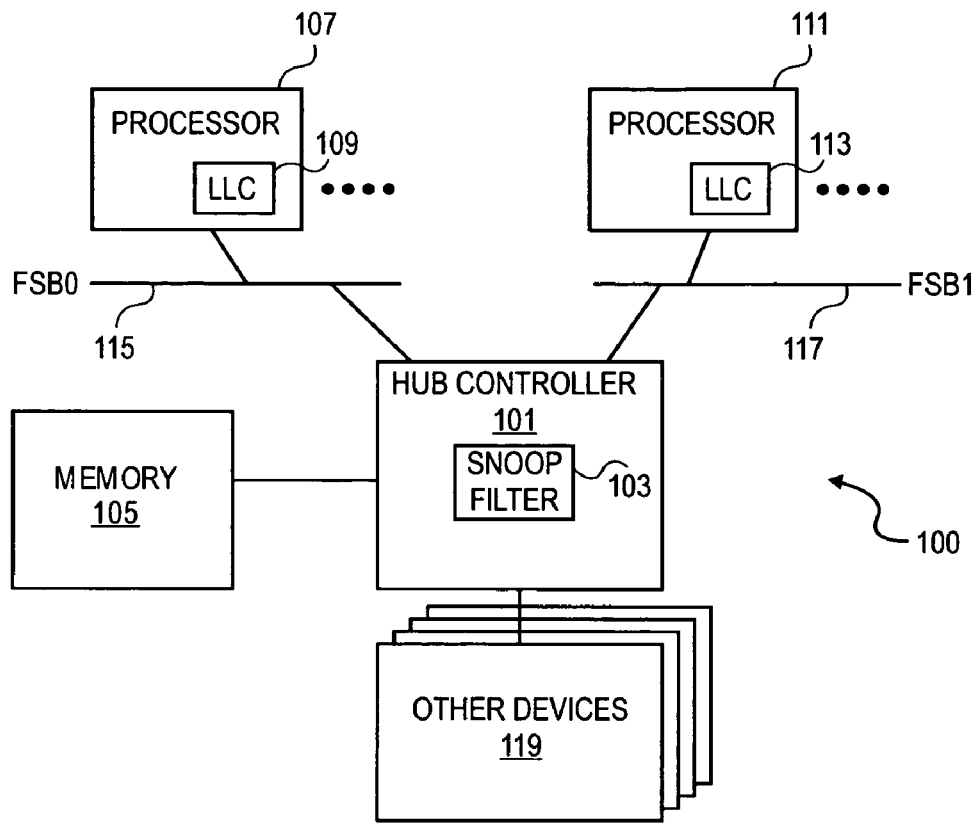
FIG. 1 is a diagram of one embodiment of a system including a way hint snoop filter.

FIG. 1 is a diagram of one embodiment of a system with a 'way hint' snoop filter. The system 100 may be any type of multiprocessor or multicore system including a personal computer, mainframe computer, handheld computer, consumer electronic device (cellular phone, handheld gaming device, set-top box, or similar device), network device, automobile/avionic electronic controller or other similar devices.

The system 100 may have any number of processors 107, 111 each having at least one cache 109, 113 associated with the processor 107, 111. In one embodiment, the system 100 may have a fixed number of processors 107, 111. In another embodiment, the system 100 may have slots or interfaces for any number of processors. The number of processors may be changed by adding or removing processors from the system.

In one embodiment, the processors 107, 111 may be processors with separate cores and on separate substrates and in separate packages. In another embodiment, the processors may contain multiple cores on a single substrate and chip package or combinations thereof. For sake of convenience in description, the example system described is a multiprocessor personal computer system. Each processor 107, 111 may have a group of caches. As used herein, "a group" may denote any number of items including one. For example, a processor may have a level 1 cache as well as a level 2 cache. The highest level cache may be referred to as a last level cache (LLC).

Each processor 107, 111 may be in communication with a hub controller 101 through a bus 115, 117. The hub controller 101 may be a device or chipset that manages the movement of data between the processors 107, 111 and system memory 105 as well as other devices 119 in the system 100. In one embodiment, a single hub controller 101 may be present in the system 100. In another embodiment, multiple hub controllers may be present or the hub controller 101 may be subdivided into multiple components. For example, some personal computer systems have two hub controllers referred to as a north bridge and a south bridge.

In one embodiment, the hub controller 101 may communicate to each processor 107, 111 over a separate bus 115, 117. In other embodiments, the multiple processors may communicate over a single bus or may share a subset of the buses. The buses 115, 117 between the processors 107, 111 and the hub controller 101 may be referred to as front side buses (FSBs).

In one embodiment, the system memory 105 may be any type of dynamic random access memory (DRAM) device or group of memory devices. For example system memory 105 may include synchronous DRAM, dual data rate DRAM, static random access memory (SRAM), and similar types of memory devices. The system memory 105 may be used to store data and program instructions for use by the processors 107, 111. In another embodiment, the system memory may be a static memory device, flash memory device or similar memory device such as an electronically erasable programmable read only memory (EEPROM), memory stick or similar device.

Other devices 119 that may be in communication with the system 100 may include network devices and cards, graphics devices, large storage devices such as hard disk drives, removable storage devices such as compact disc (CD) and digital versatile disc (DVD) drives and similar devices. The presence of these devices may vary depending on the type of device of which the system 100 is a part. For example, if the system is a network device then multiple network cards or communication devices may be present, but graphics devices such as graphics cards and monitors may be absent.

In one embodiment, the multiprocessor system 100 manages data coherency between processors within the hub controller 101. This may be accomplished through the management of LLC data for each of the processors 107, 111. A snoop filter 103 may participate in the management of data coherence between the processors 107, 111. The snoop filter 103 may maintain a cache coherency state representation of the data stored in each of the LLCs 109, 113, where the cache coherency state representation represents the organization of the data in each of the LLCs 109, 113. The snoop filter 103 may monitor requests for data from each processor 107, 111. These data requests, such as read requests, may contain intended cache state information, as well as request information. Request information may include, for example, a request type, way hint, affinity indicator, tag address, and set address. The snoop filter may use the intended cache state information and request information to maintain a cache coherency state representation of the organization of each of the caches 109, 113 that is up to date.

Figure 2:
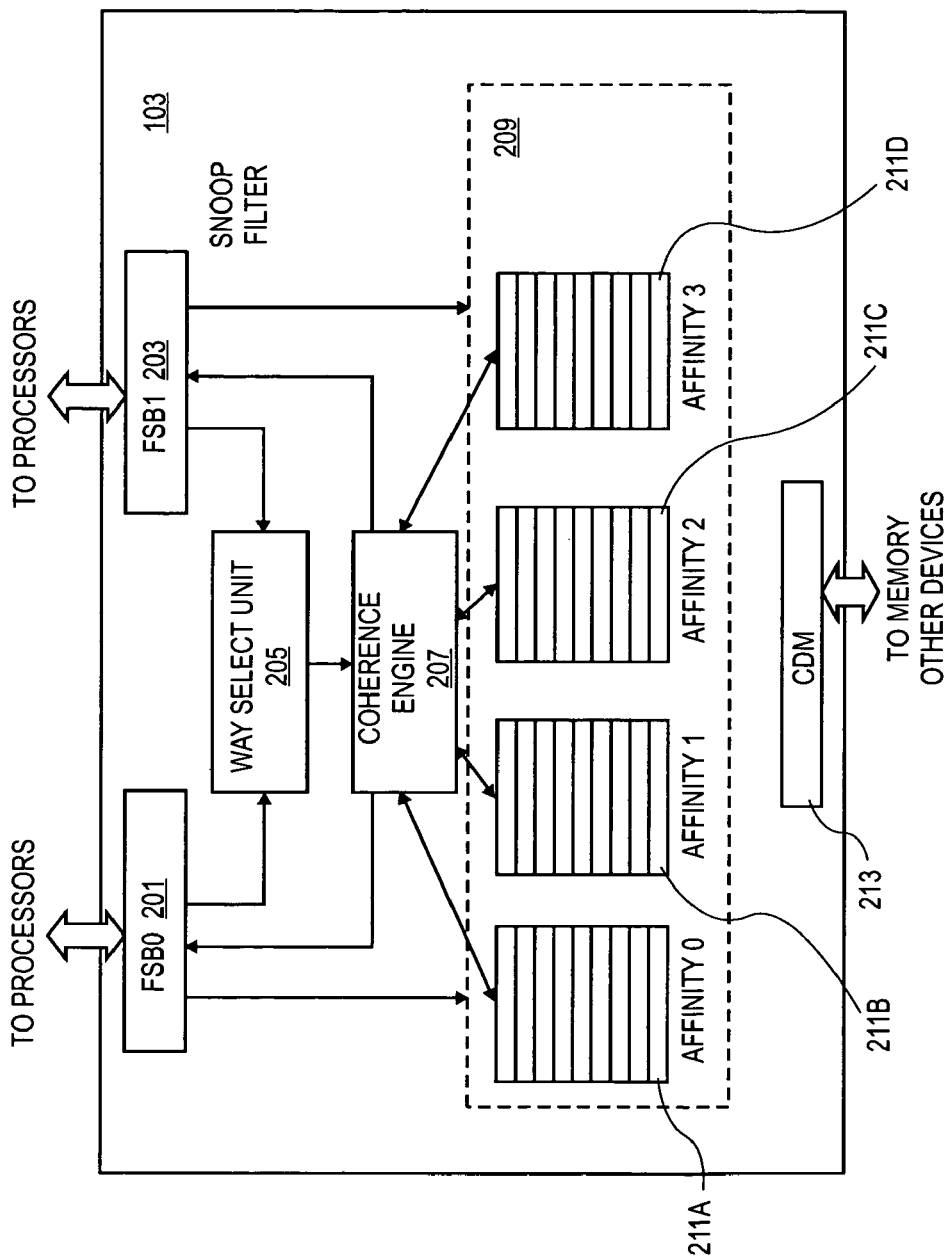
FIG. 2 is a diagram of one embodiment of a way hint snoop filter.

FIG. 2 is a diagram of one embodiment of a snoop filter 103. The snoop filter 103 includes a cache state storage structure 209. In one embodiment, the cache state storage structure is a cache such as a set associative cache or similar storage structure that may store coherency records. The cache state storage structure 209 may be organized to represent each of the LLCs of the processors in the system. The cache state storage structure 209 may be subdivided logically into a group of affinities. There may be one affinity for each processor in the system. An affinity may be a storage device or a section of the cache state storage structure 209 that is organized in the same organizational manner as the associated LLC that the affinity represents.

Figure 3A:
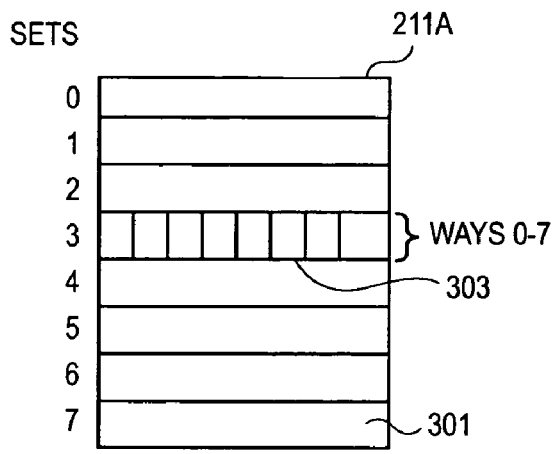
FIG. 3A is a diagram of one embodiment of an affinity in a way hint snoop filter.

FIG. 3A is a diagram of one embodiment of an affinity in the cache state storage structure 209 of the snoop filter 103. Each affinity 211A-211D may include a group of 'sets.' A set is a type of location indicator that is composed of a group of 'ways.' A way is a slot or location indicator of a cache line in a set. Each set may contain any number of ways. In one embodiment, each set may contain eight ways. The number of sets and ways in each affinity may be determined based on the corresponding organization of the LLCs in the processor. The indexing scheme of affinities, sets and ways is one example embodiment. Any other indexing and organizational scheme may be used such that the snoop filter data structure 209 models the organization of each of the LLCs. For sake of convenience, embodiments of the affinity, set and way organization are described. However, other embodiments with other organization schemes may also be utilized.

Figure 3B:
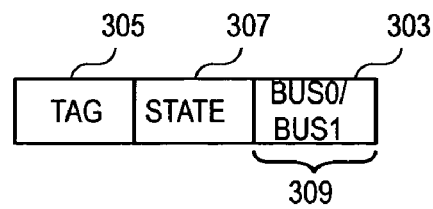
FIG. 3B is a diagram of one embodiment of a cache entry in the way hint snoop filter.

FIG. 3B is a diagram of one embodiment of a coherency record in a way 303 of the cache state storage structure 209. In an embodiment, each coherency record may store information about the corresponding cache entry in the LLC. A coherency record 303 may include tag address data 305, cache state data 307 and bus indicator data 309. The tag address data 305 may be data that matches tag data in the cache of the corresponding LLC. For example, tag address data 305 may be a portion of an address for a cache line. The cache state data 307 may be data indicating the status of the cache line in the LLC such as whether the data is exclusive to the processor, shared, invalid, modified or similar status information. The bus indicator data 309, may be a set of bits used to indicate the bus over which the LLC holding the data communicates with the hub controller. The bus indicator data 309 may have a bit corresponding to each bus line available in the system or may encode the bus lines over which the processors communicate with the hub. A cache entry may be present in more than one LLC, such that multiple buses may need to be used to communicate state data related to a cache entry in each of the LLCs.

Returning to the discussion of FIG. 2, the snoop filter 103 may be in communication with each processor through an interface 201, 203 for the respective bus of the processor. In one example, the snoop filter 103 may be in communication with two processors, each having a separate bus. In this example, the snoop filter 103 has a first interface 201 for communicating over the first bus with the first processor and a second interface 203 for communicating with the second processor over a second bus.

Upon receiving a request for data from a processor through a bus interface 201, 203, the request may be parsed or processed to determine an affinity indicator, as well as a 'way hint'. A request may be a read request, a request for exclusivity or similar data request. In one embodiment, the request may contain a way number indicating the way location or way hint in which the data being requested will be stored in the LLC of the requesting processor. In another embodiment, other information, such as the coherency status of the victim entry in the LLC, may be provided.

In one embodiment, the request information may be provided to a coherence engine 207 or may be applied to the cache state storage structure 209 to determine if the tag address corresponding to the requested data is present in any of the affinities 211A-211B and therefore any of the LLCs of the processors in the system. The results of the search may then be returned to the coherence engine 207. In one embodiment, the search may be conducted by applying the requested tag data to each of the affinities and determining the location in the affinity of any matching tags, utilizing the set associative features of the cache state storage structure 209. In another embodiment, other search techniques may be utilized.

The coherence engine analyzes the search results along with the way hint, tag address data, bus or processor identification information, and set location indication. In an embodiment, the set location may be specified in the request, and may be a fixed one to one mapping, simple binary decode, table look up, or special hashing function decode to provide a one to one consistent mapping. The way may be performed using tag look up (upper address field comparison), or if not found in the look up, other selection schemes may be used, including but not limited to pLRU (pseudo-least-recently-used), complete or partial way-hint, or random.

Alternatively, the set location may be determined by applying the same algorithm for selecting a set that is applied by the corresponding processor and LLC for selecting a set. In this way, set indicator information does not have to be explicitly included in the request data. Any set selection algorithm may be used, including a random selection algorithm, a round robin algorithm or similar algorithm. In another embodiment, the set indicator data or similar data is included in the request.

In one embodiment, the coherence engine 207 analyzes the input data and determines how to forward the request received from the processor, how to update the snoop filter data structure 209 and whether to generate invalidation messages to be sent to the appropriate LLC. Invalidation messages and requests to be forwarded to other processors are then sent to the appropriate bus interface 201, 203. Requests that are forwarded to memory to be completed are sent to the central data manager (CDM) 213. The central data manager 213 is responsible for managing the transfer of data between the hub controller and system memory as well as other devices.

Figure 4:
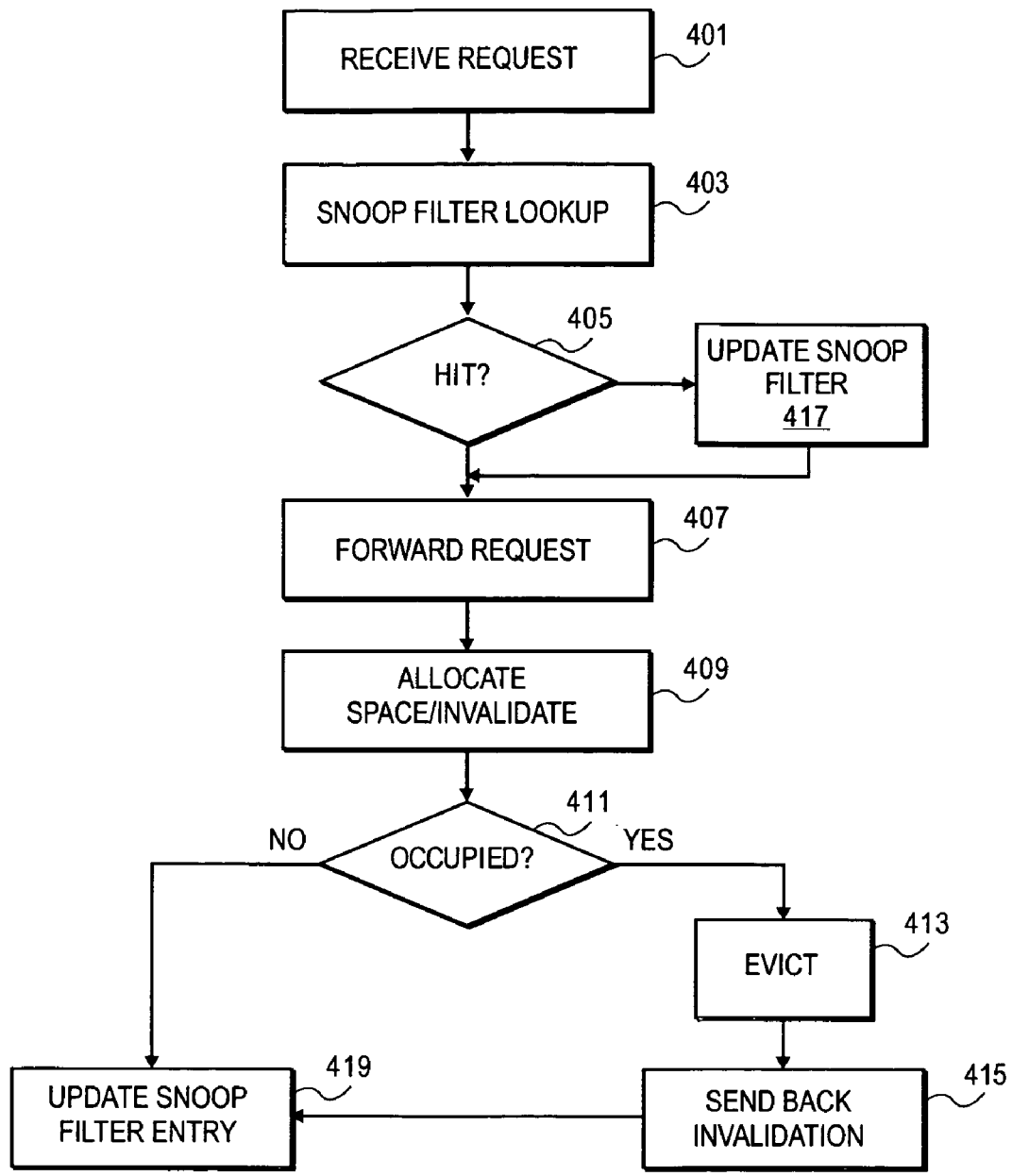
FIG. 4 is a flow chart of one embodiment of a process for cache management based on way hints.

FIG. 4 is a diagram of one embodiment of a process performed by the snoop filter to maintain data coherence. In one embodiment, the process is initiated by receiving a request from a processor (block 401). The request may be a read request, request for exclusivity or similar request for data. The request may be applied to the data structure of the snoop filter to determine if the requested data is present (block 403). The process may be a look up process, search process or similar process.

After the results of the look up process are obtained, the request may be forwarded to the appropriate destination to be fulfilled (block 405). In the case that the requested data is found in the data structure, then the request is forwarded to the processor and cache containing the data. The processor or cache holding the requested data may be indicated in the results of the lookup and determined based on the affinity in which a match to the request is found. In the case that the requested data is not found then the request is forwarded to the system memory to be completed. Similarly, if requested data is found in the data structure but its state information indicates it is invalid, then the request is completed at the system memory.

To accommodate the data to be returned to the requesting processor cache, the representation of the cache maintained by the snoop filter is updated. The representation is updated by allocating space for the new entry. The affinity for updating in response to the request is determined by detecting the bus on which the request was received. The request may also be parsed or processed to determine the way hint or location hint contained within the request. The slot for storing the new entry in the snoop filter is selected based on the way hint provided by the request and by using a set selection algorithm that matches the set selection algorithm of the requesting processor. In this manner, corresponding entries are allotted for the requested data in the cache of the requesting processor and the data structure of the snoop filter. This scheme allows for the data structure to be smaller than a traditional cache and lowers the likelihood of dropping a cache entry in use by any of the processors, and minimizes the use of the bandwidth of the bus between the hub controller, requesting processor and any processor fulfilling a request.

A check is made to determine if the selected space in the cache is occupied (block 409). If the slot is not occupied then the slot is updated to reflect the data being stored in the corresponding space in the requesting processor cache. (block 413). The data is updated in the snoop filter when the request returns from the processor where the request is completed or from memory depending on the location of the requested data. If the slot is occupied, the slot is evicted (block 411). The evicted data may be temporarily stored in a buffer until an invalidation message is sent to the originating processor to ensure that the requesting processor does not rely on that data in the case that it was not already invalidated (block 415).

If the data is retrieved from another processor, the entry for that processor may be invalidated by sending an invalidation message to that processor. For example, if a request for exclusivity is received for data in the cache of another processor, then an invalidation message is sent to that processor after the data is received.

Figure 5A:
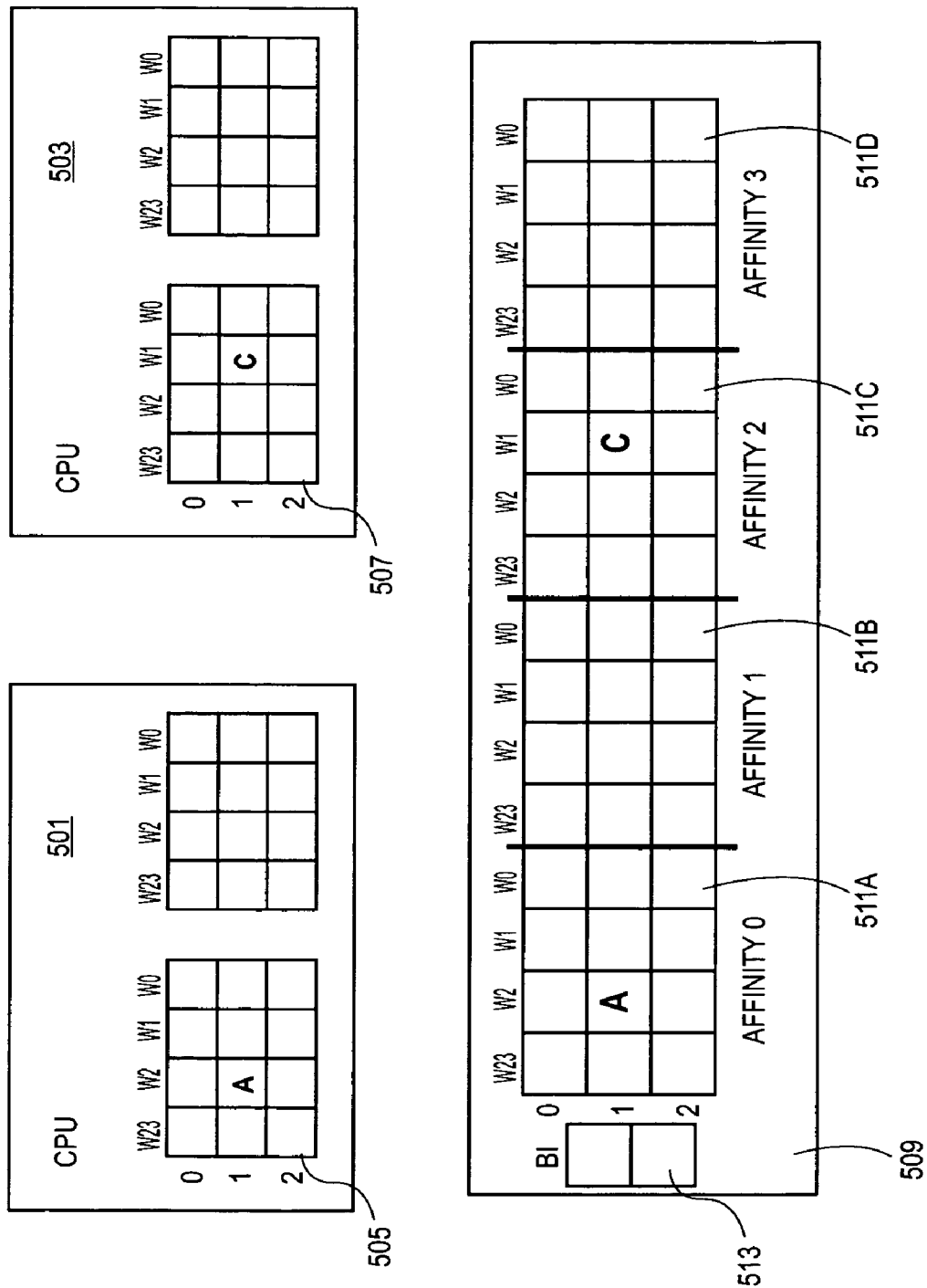
FIG. 5A is a diagram of one example of a cache management process.

FIGS. 5A-5D are diagrams of an example of the operation of the snoop filter replacement algorithm. In this example, two central processing units (CPUs) are in communication with the snoop filter 509. The two CPUs may be dual core and have multiple caches, one for each core. The snoop filter 509 has a set of corresponding affinities 511A-511D. In this example, affinity 511A corresponds to cache 505 and affinity 511C corresponds to cache 507. In FIG. 5A, cache 505 includes a data item A and cache 507 includes data item C. Affinity 511A, which corresponds to cache 505 includes an indicator of item A in a location corresponding to the location of item A in cache 505, namely set 1, way 2. Similarly, cache 507 includes item C in set 1, way 1. Affinity 511C includes an indicator of item C in corresponding set 1, way 1.

Figure 5B:
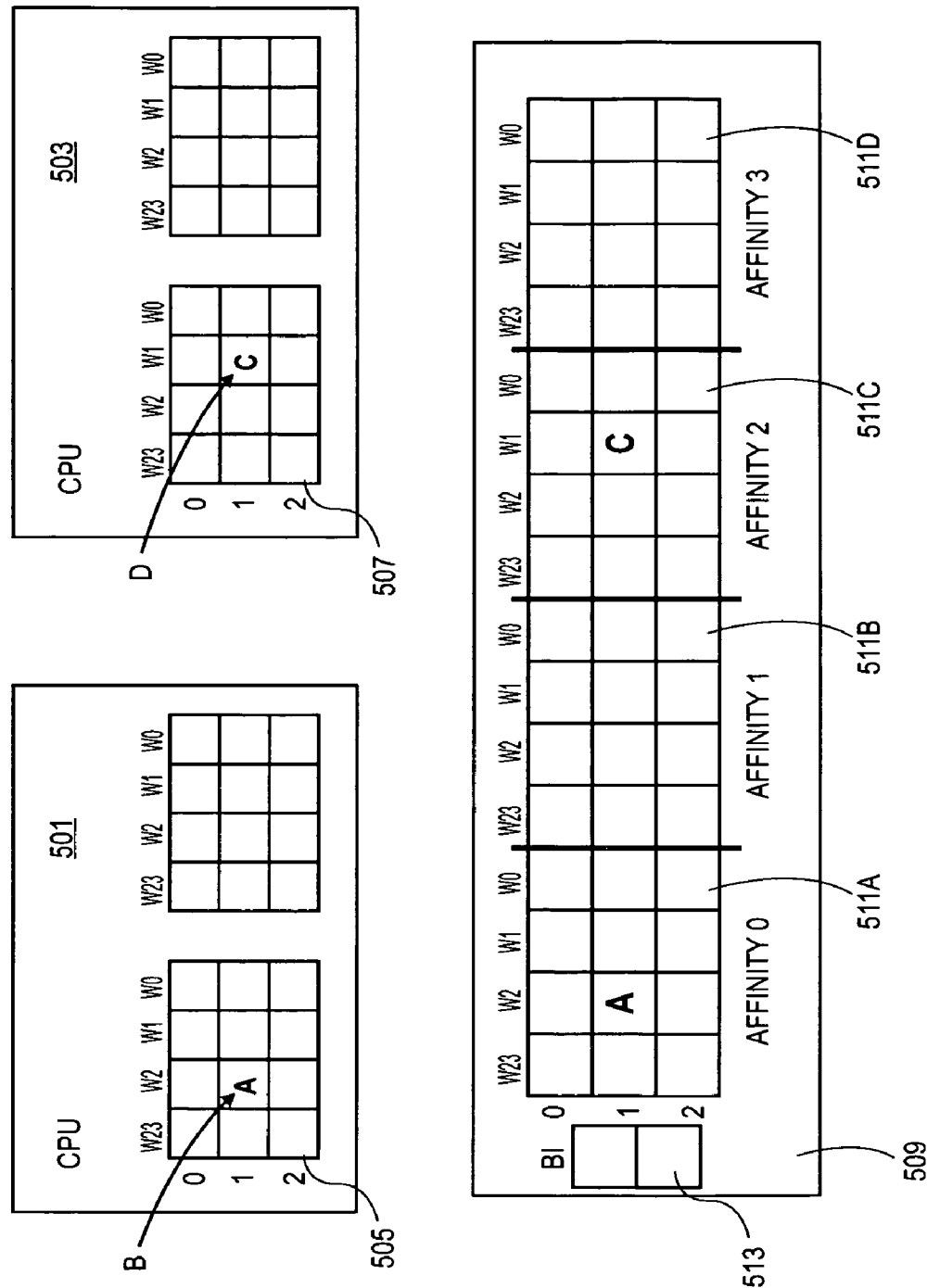
FIG. 5B is a diagram of one example of a cache management process.

FIG. 5B is a diagram of the example, showing the initiation of a request for data item B by processor 501 and a request for data item D by processor 503. Processor 501 selects set 1, way 2 in which to store the requested item. The selection of this location in the LLC 505 may be based on any algorithm, including a round robin, least recently used, or similar replacement algorithms or combinations thereof. Likewise, the processor 503 selects set 1, way 1 to store requested item D.

Figure 5C:
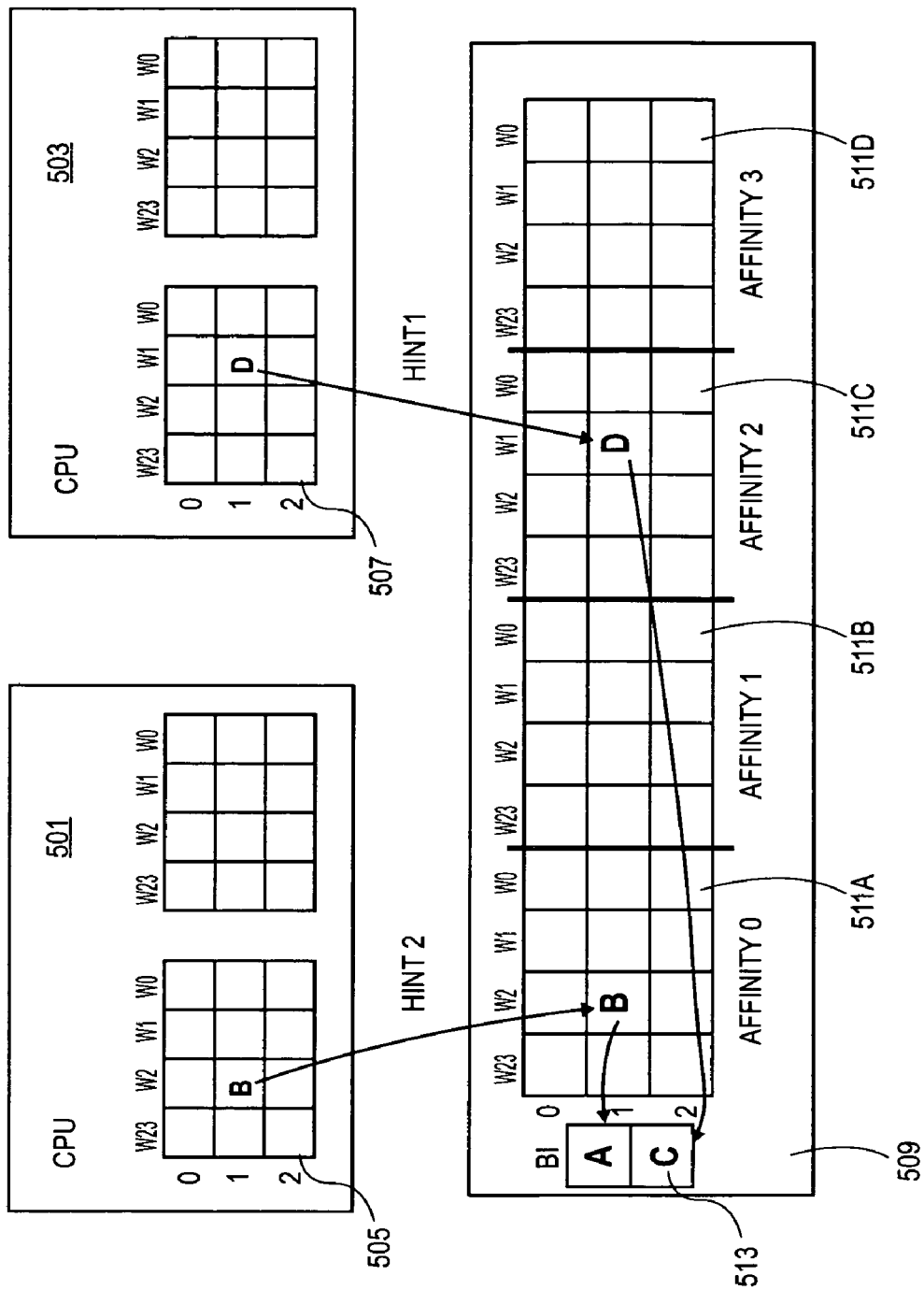
FIG. 5C is a diagram of one example of a cache management process.

FIG. 5C is a diagram of the example, showing the state of the system after the request has been fulfilled. In this case, data items B and D were not present in the snoop filter 509 and were completed at the system memory, resulting in the storage of items B and D in the selected locations in the LLCs 505, 507. Also, the corresponding entries in the affinities 511A, 511C have been updated using the request data provided including the way hints 2 and 1, respectively, and knowledge of the set selection algorithms of each processor 501, 503. The data items A and C that have been evicted are temporarily stored in back invalidation buffer 513.

Figure 5D:
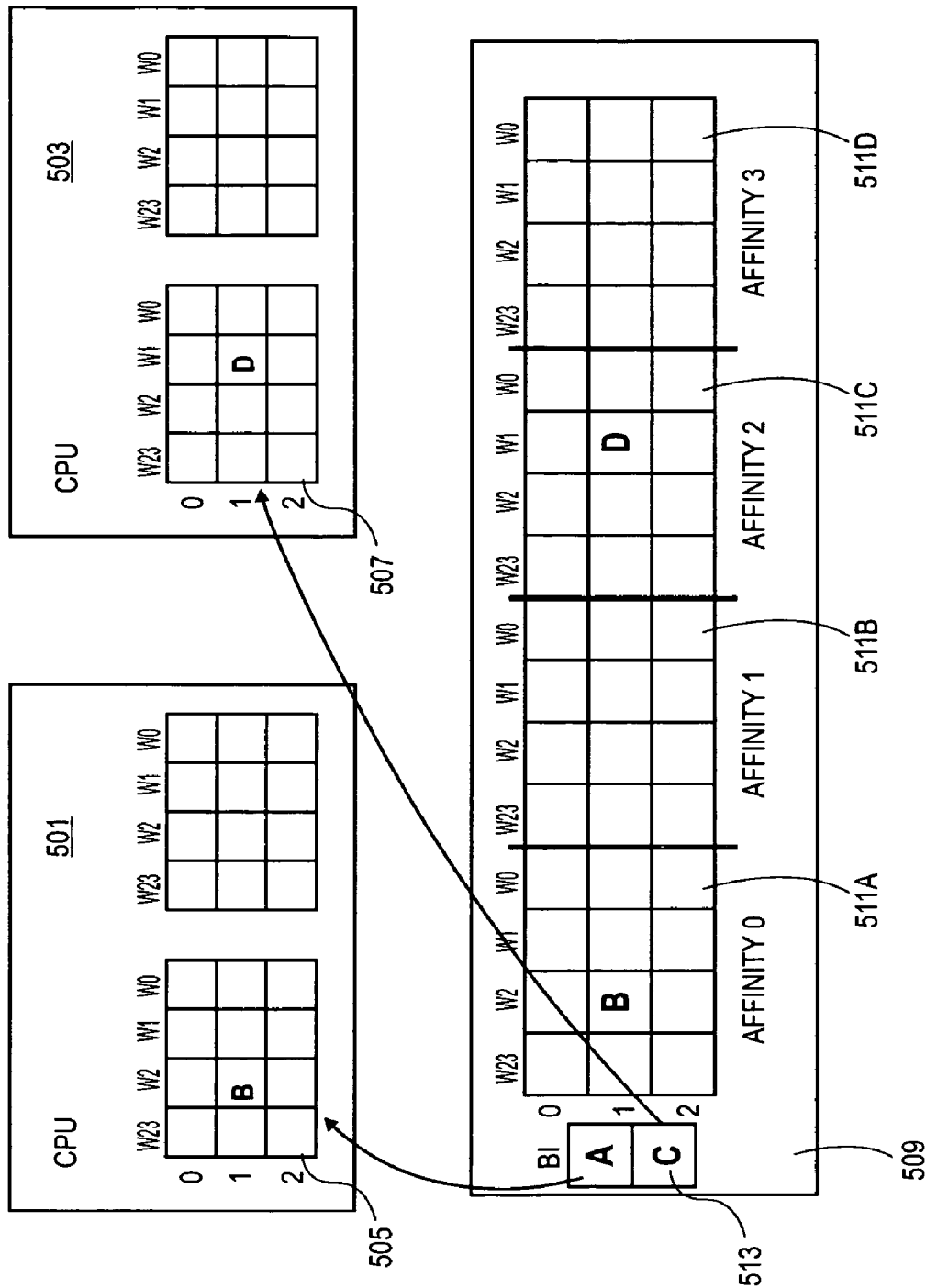
FIG. 5D is a diagram of one example of a cache management process.

FIG. 5D is a diagram of the example, showing the sending of back invalidation messages to the processors 501, 503 and LLCs 505, 507. The back invalidation messages for data items A and C may be sent to either processor 501, 503 that the evicted snoop filter entry references as indicated by bus indicator data 309 (FIG. 3B). These messages ensure data coherency in the case that the snoop filter does not fully track the cache lines in processors 501, 503, the way hint is not properly determined, the set selection algorithms do not match between the processors 501, 503 and the snoop filter 509, or the data is cached in the lower level caches (not shown) inside processors 501, 503.

Referring back to FIG. 3A, in another embodiment, the number of sets in each affinity may be determined based, at least in part, on the corresponding organization of the LLCs in the processor, and the number of ways in each set of the affinity may be a reduced set of the ways in the corresponding LLCs of the processors. In this embodiment, each way may store data about the corresponding cache entry location in the LLC, where the corresponding cache entry may be derived if the requested cache entry is not found.

Figure 6:
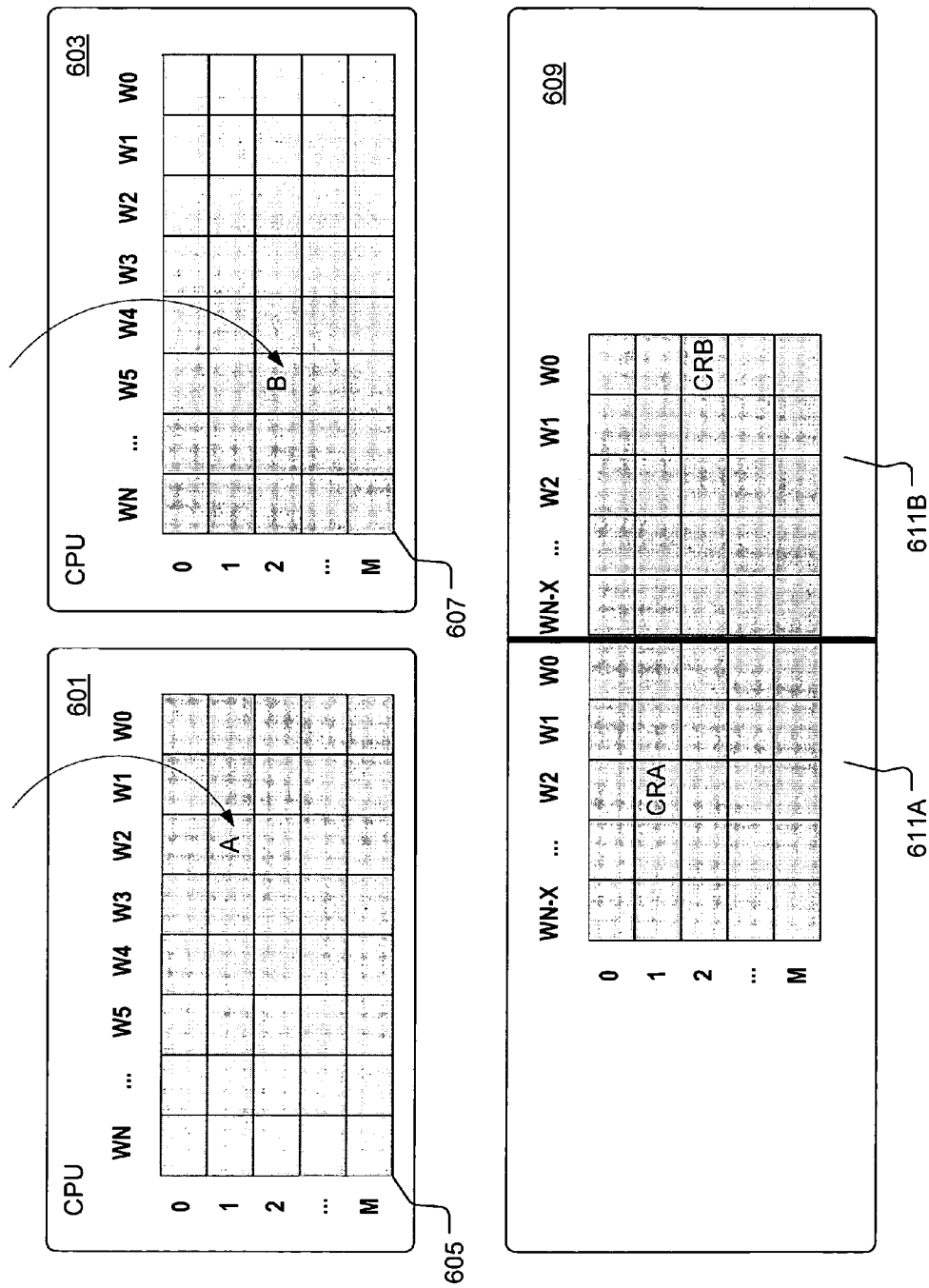
FIG. 6 is a diagram of an example of a cache management process in accordance with another embodiment.

Referring to FIG. 6, as an example, processor 601 may comprise one or more caches 605, and processor 603 may comprise one or more caches 607 (only one cache per processor illustrated). Snoop filter 609 may comprise a set of affinities 611A-611B each corresponding to a processor 601, 603. In this example, affinity 611A corresponds to cache 605 and affinity 611B corresponds to cache 607. In this example, each cache 605, 607 comprises M sets, and N ways. Furthermore, each corresponding affinity 611A, 611B comprises M sets and N-X ways (where X is an integer greater than 0), such that there are less ways per set in each affinity 611A, 611B than in each corresponding cache 605, 607. In the example shown, let M=5, N=10, X=5 so that each cache 605, 607 comprises 5 sets, and each set comprises 10 ways; and so that each affinity 611A, 611B comprises 5 sets, and each set comprises (a reduced) 5 ways.

Figure 7:
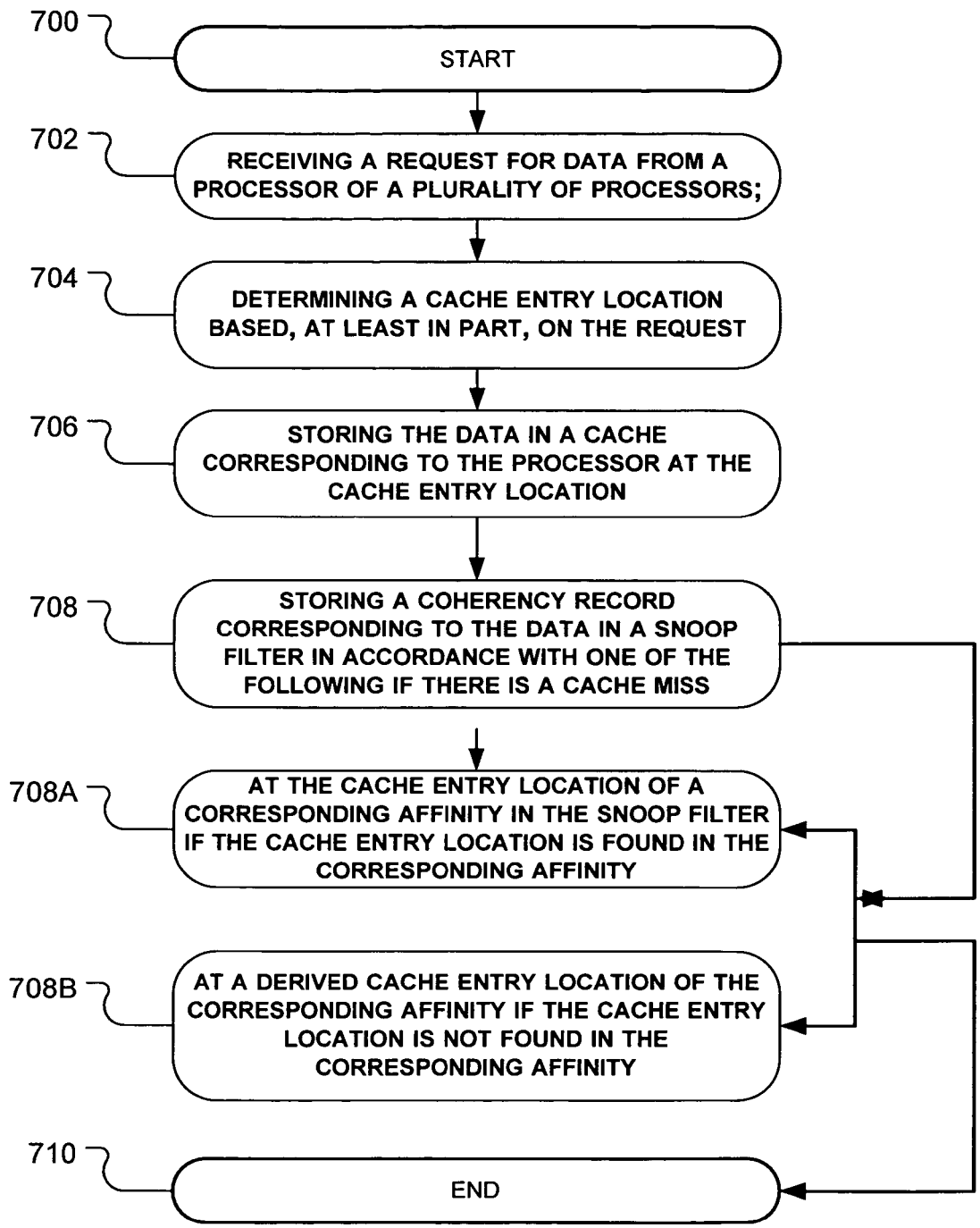
FIG. 7 is a flowchart illustrating a method in accordance with another embodiment as illustrated in FIG. 6.

FIG. 7 is a flowchart illustrating a method in accordance with this embodiment. The method begins at block 700 and continues to block 702 where the method may comprise receiving a request for data from a processor of a plurality of processors. Referring back to FIG. 6, in one example, processor 601 may request data item A.

At block 704, the method may comprise determining a cache entry location based, at least in part, on the request. In an embodiment, the cache entry location may comprise a set and a way. In an embodiment, the request may comprise a way hint. In another embodiment, both the set and the way may be included in the request.

In FIG. 6, cache entry location may comprise set 1, way 2. In this example, if there is a cache miss (i.e., if the requested data is not present in the snoop filter 609, and therefore is not found in any processor caches 605, 607, or is present in the snoop filter 609 but is marked invalid), the data request may be completed at the system memory.

At block 706, the method may comprise storing the data in a cache corresponding to the processor at the cache entry location.

Referring back to FIG. 6, upon retrieving data item A from system memory, data item A may be stored in the determined cache entry location of the processor cache 605.

At block 708, if there is a cache miss, the method may comprise storing a coherency record corresponding to the data in a snoop filter in accordance with one of blocks 708A and 708B.

At block 708A, the method may comprise storing the coherency record at the cache entry location of a corresponding affinity in the snoop filter if the cache entry location is found in the corresponding affinity.

Again referring to FIG. 6, since the cache entry location in this case is found in the corresponding affinity 611A (i.e., set 1, way 2), the corresponding affinity 611A may be updated by additionally storing coherency record CRA (corresponding to data item A in processor 601) at the cache entry location of the corresponding affinity 611A. In an embodiment, since each set of processor caches 605, 607 is duplicated in the corresponding affinities 611A, 611B but each way number is not duplicated, the requested cache entry location is found if the way number (i.e., way 2) is located in the affinity 611A corresponding to the cache 605.

At block 708B, the method may comprise storing the coherency record at a derived cache entry location of the corresponding affinity if the cache entry location is not found in the corresponding affinity.

Referring back to FIG. 6, upon retrieving data item B from system memory, data item B may be stored in the selected cache entry location of the processor cache 607. In this example, since the cache entry location is not found in the corresponding affinity 611B (i.e., set 2, way 5), the corresponding affinity 611B may be updated by additionally storing coherency record CRB (corresponding to data item B) at a derived cache entry location of the corresponding affinity 611B. In an embodiment, since each set of processor caches 605, 607 is duplicated in the corresponding affinities 611A, 611B but each way number is not duplicated, the requested cache entry location is not found if the way number (i.e., way 5) is not located in the affinity 611B corresponding to the cache 607.

For example, storing the coherency record at a derived cache entry location of the affinity corresponding to the cache may comprise storing the coherency record at a randomly selected way in the affinity. This way may be any of the ways in the affinity that may be selected. In affinity 611B (assuming 5 ways), for example, this may comprise W0, W1, W2, W3, or W4.

As another example, storing the coherency record at a derived cache entry location of the affinity corresponding to the cache may comprise calculating a way number. This may comprise calculating a way number based, at least in part, on the way number, and a number of ways of the associated affinity. For example, as illustrated in FIG. 6, the derived way number may comprise the selected way number (e.g., 5) modulo the number of ways in the affinity 611B (5 ways in affinity 611B), which in this case is 0. Therefore, in FIG. 6, data item B may be stored in set 2, way 0. Of course, other methods of calculation may be used.

The method may end at block 710.

Figure 8A:
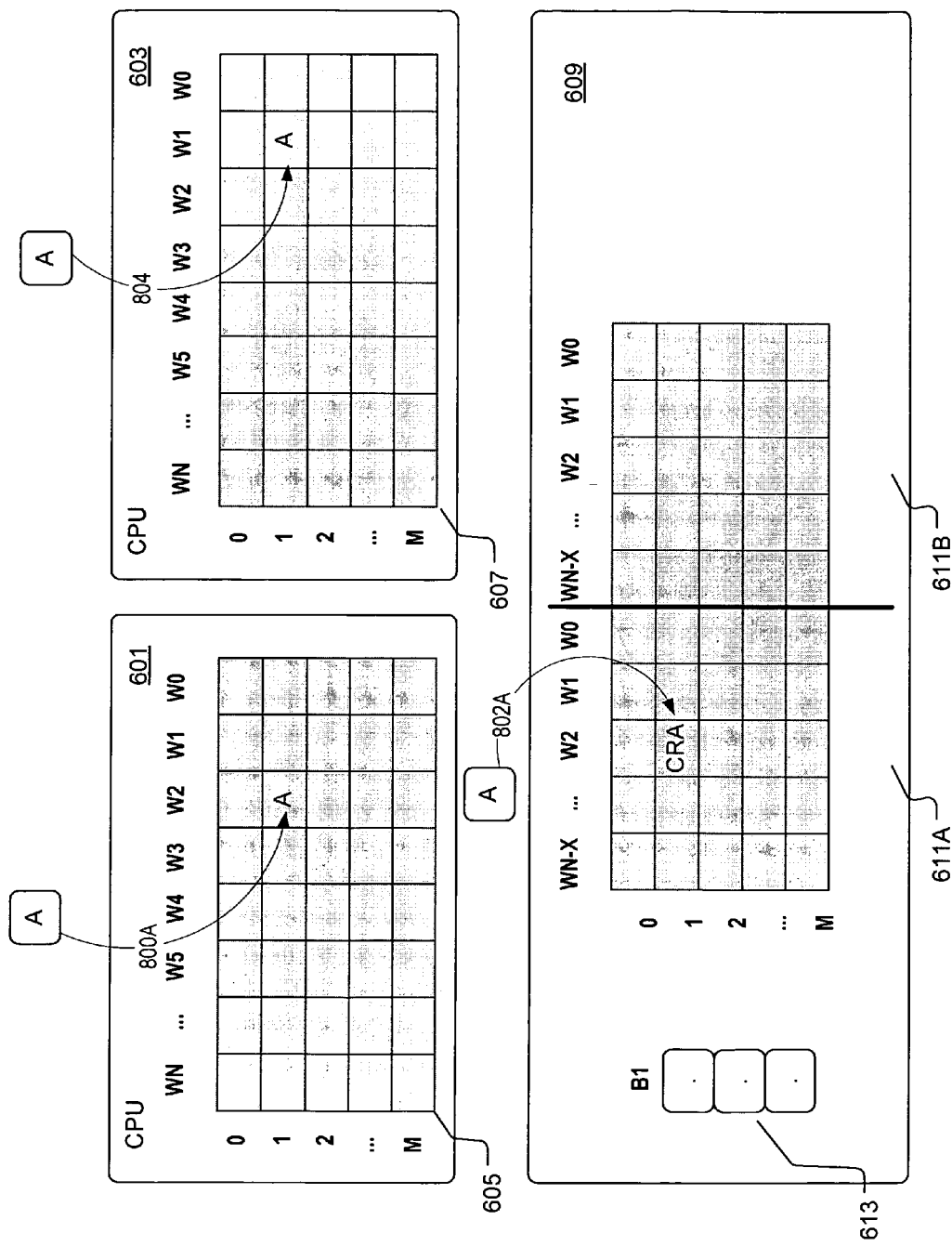
FIGS. 8A-8D are diagrams illustrating a line placement process in accordance with one embodiment.

FIG. 8A illustrates a scenario in which data item A may be shared. In this example, data item A may first be requested by processor 601, and stored in cache entry location represented by set 1, way 2 of processor cache 605 (800A). Corresponding affinity 611A may be updated by additionally storing coherency record CRA (corresponding to data item A) at the determined cache entry location of the affinity 611A (802A). Subsequently, data item A may be requested by processor 603, and stored in cache entry location represented by set 1, way 1 of processor cache 607 (804A).

Figure 8B:
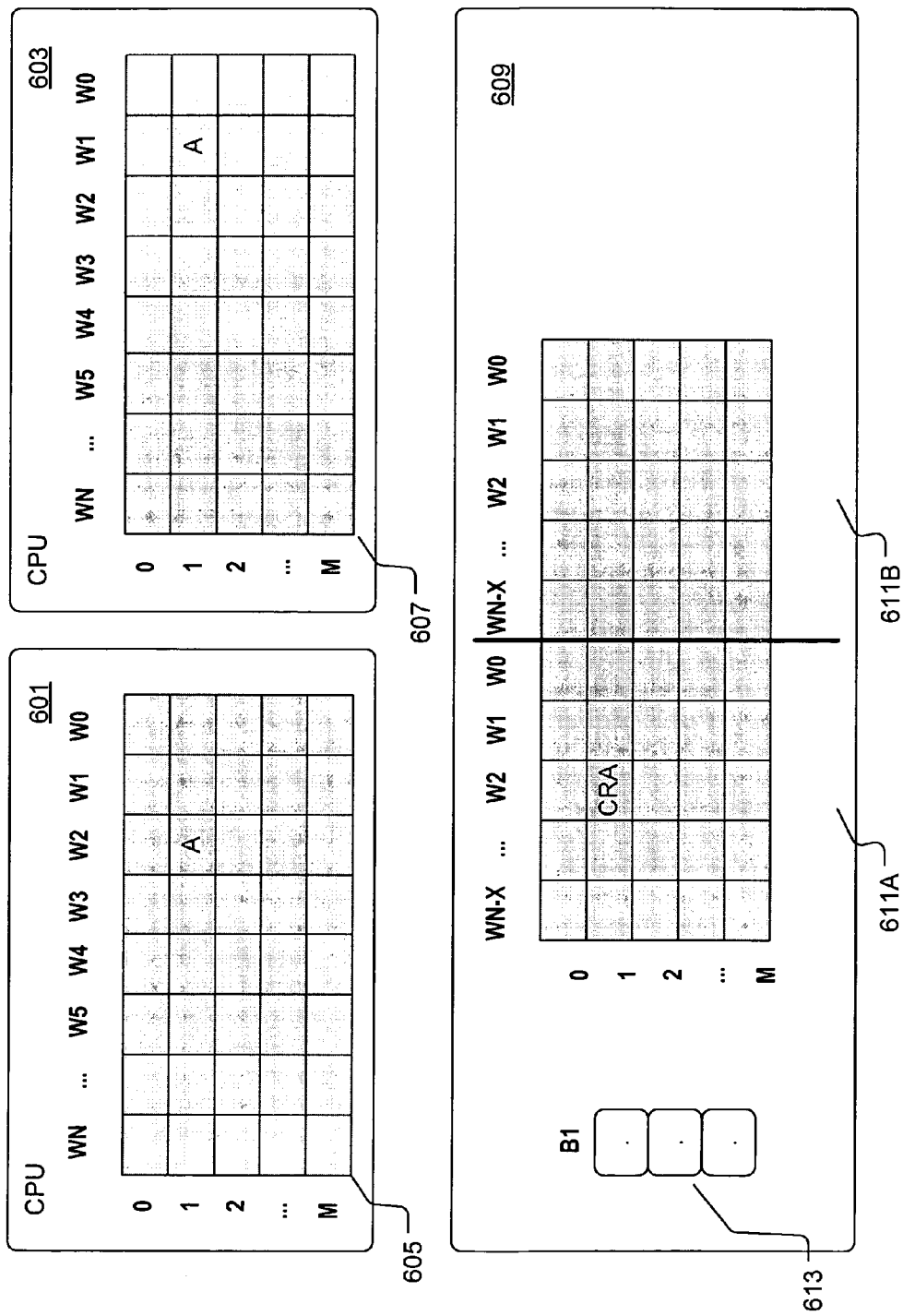

In one embodiment, since coherency record CRA corresponding to data item A has already been stored in affinity 611A, corresponding affinity 611B is not updated. In this embodiment, only the affinity corresponding to the cache of the first processor accessing the data item is updated. FIG. 8B illustrates the resulting state of caches 605, 607 and corresponding affinities 611A, 611B.

Figure 8C:
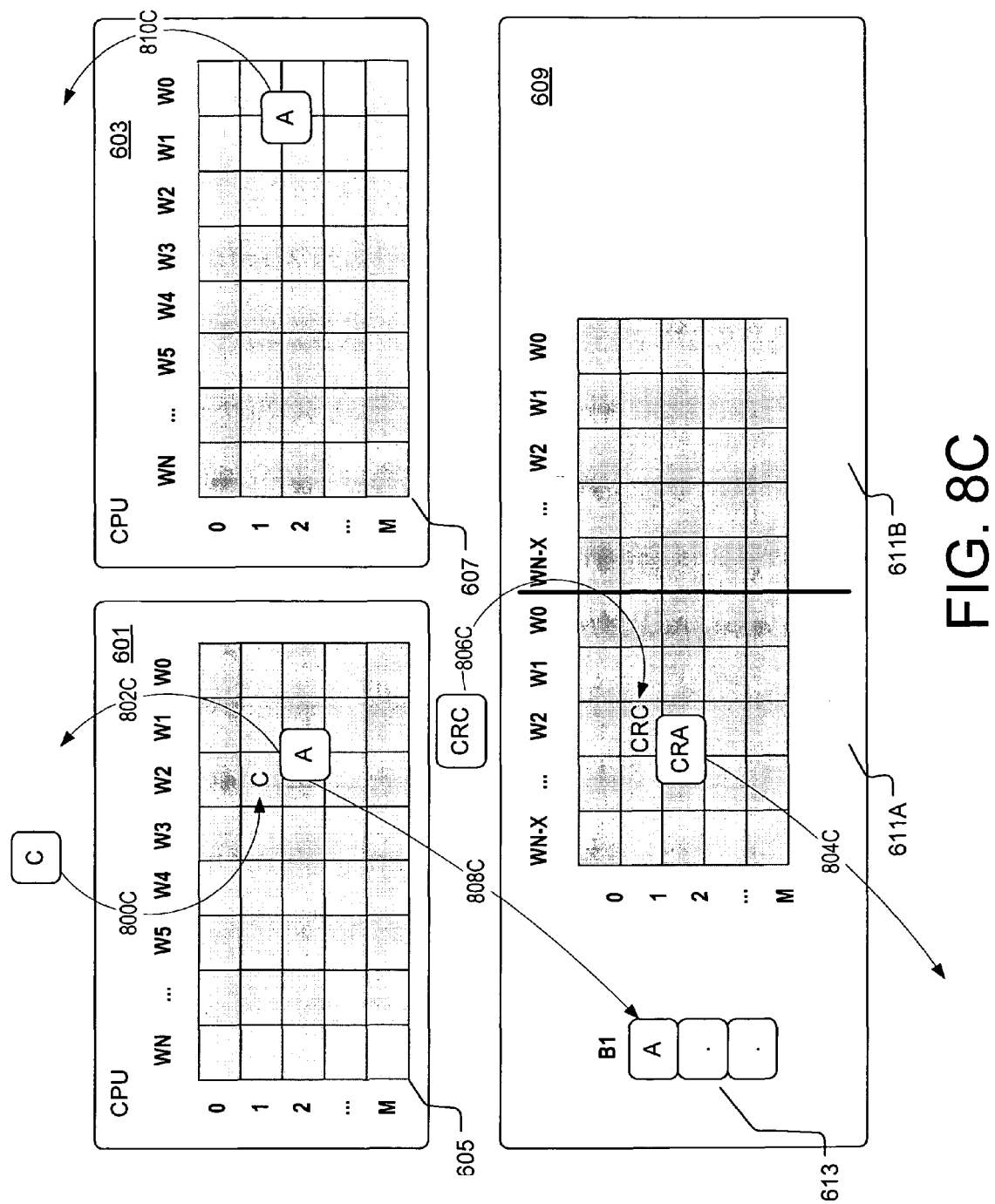
Figure 8D:
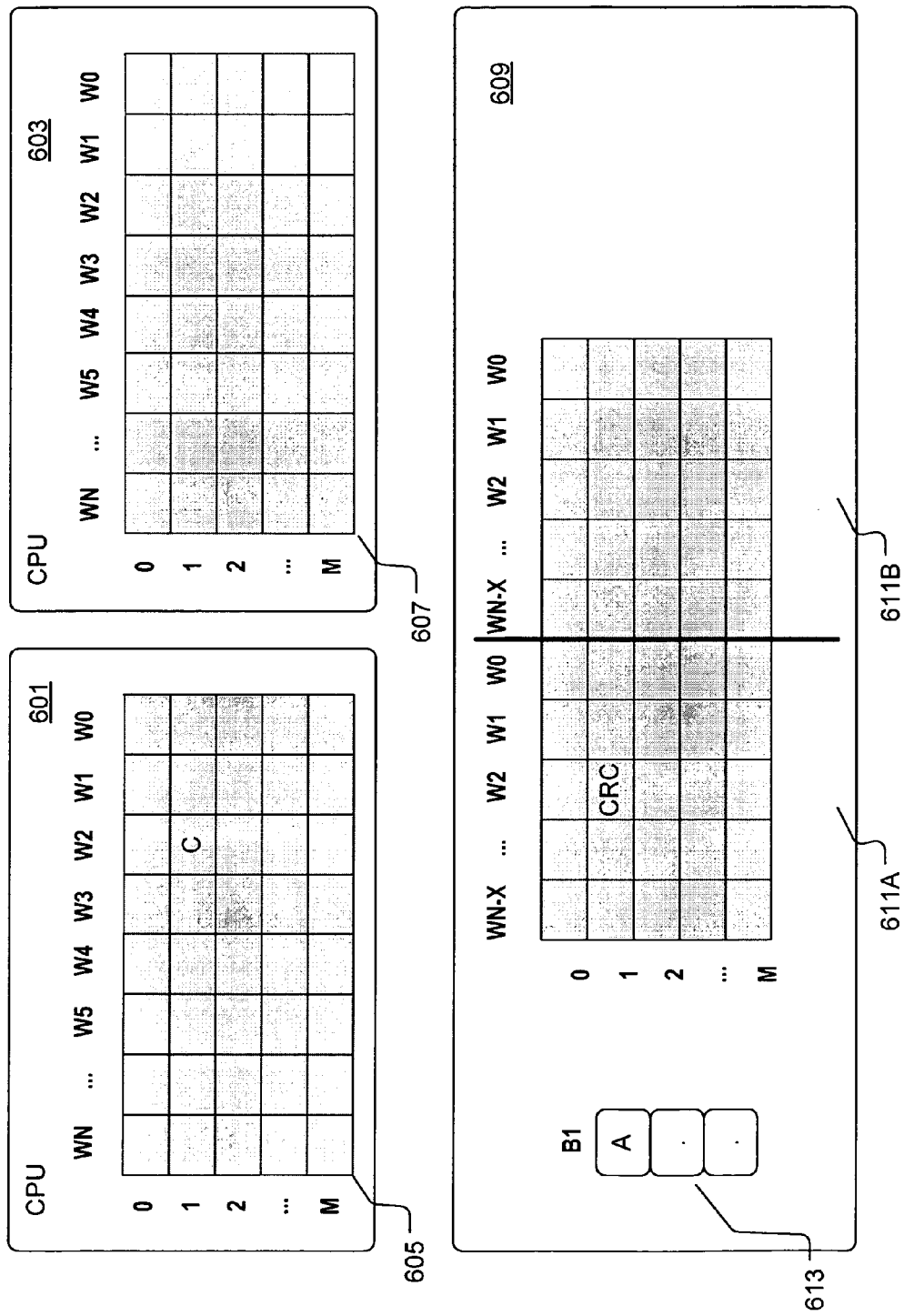

Referring to FIG. 8C, if processor 601 subsequently requests data item C, and selects cache entry location represented by set 1, way 2 of processor cache 605 in which to store data item C, then upon retrieving data item C, it may be stored in the determined cache entry location of processor cache 605 (800C). Since this cache entry location is occupied (i.e., contains data item A), data item A may be evicted from the cache entry location in the cache 605 (802C). Furthermore, corresponding coherency record CRA may be evicted from the cache entry location of the corresponding affinity 611A (804C), and coherency record CRC corresponding to data item C may be stored in the cache entry location of the corresponding affinity 611A (806C). Evicted data item A may then be temporarily stored in back invalidation buffer 613 (808C), and a back invalidation message may be sent to one or more of processors sharing data item A resulting in the eviction of data item A from the corresponding caches (810C). FIG. 8D illustrates the resulting state of caches 605, 607 and corresponding affinities 611A, 611B. As a result of the back invalidation, a subsequent request for data item A by processor 603 (and any other processors in which data item A was previously cached prior to the back invalidation message) may result in a cache miss. In a high sharing workload environment, this may significantly increase the cache miss rate.

Figure 9:
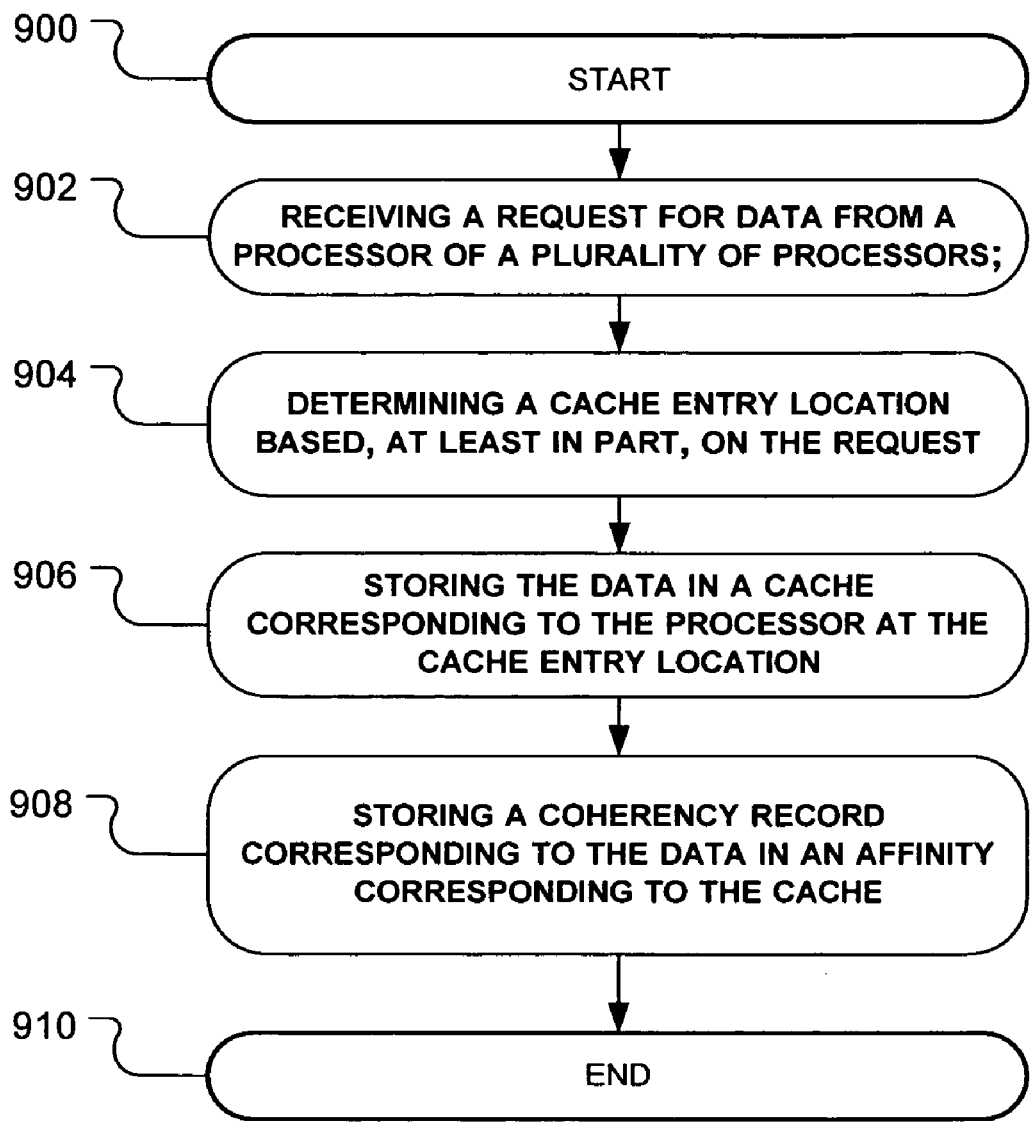
FIG. 9 is a flowchart illustrating a method in accordance with another embodiment of the invention as illustrated in FIG. 6.

FIG. 9 illustrates a method in accordance with another embodiment of the invention. The method begins at block 900 and continues to block 902 where the method may comprise receiving a request for data from a processor of a plurality of processors, the request including a cache entry location. In an embodiment, the cache entry location may comprise a set and a way.

At block 904, the method may comprise determining a cache entry location based, at least in part, on the request. In an embodiment, the cache entry location may comprise a set and a way. In an embodiment, the request may comprise a way hint. In another embodiment, both the set and the way may be included in the request.

In FIG. 6, cache entry location may comprise set 1, way 2. In this example, if there is a cache miss (i.e., if the requested data is not present in the snoop filter 609, and therefore is not found in any processor caches 605, 607, or is present in the snoop filter 609 but is marked invalid), the data request may be completed at the system memory.

At block 906, the method may comprise storing the data in a cache corresponding to the processor at the cache entry location.

Referring back to FIG. 6, upon retrieving data item A from system memory, data item A may be stored in the determined cache entry location of the processor cache 605.

At block 908, the method may comprise storing a coherency record corresponding to the data in an affinity corresponding to the cache. In contrast to the embodiment described in FIG. 7, the coherency record may be stored in an affinity (of, e.g., requesting processor) regardless of whether a cache miss occurs.

In this embodiment, if a cache hit occurs, the coherency record may be stored in the affinity that corresponds to the cache of the requesting processor. In an embodiment, the specific cache entry location of the affinity may be selected according to the way-hint replacement policy (complete or partial). Specifically, in an embodiment, the cache hit may occur at another cache entry location of another cache of another processor of the plurality of processors. In this case, the coherency record corresponding to the requested data is stored in the cache entry location of the affinity that corresponds to the cache of the requesting processor by swapping the data in the other cache entry location of the other cache (i.e., cache containing the requested data) with data at the cache entry location of the affinity corresponding to the cache of the requesting processor. In other words, the coherency record in the affinity corresponding to the cache of the requesting processor is migrated to the affinity corresponding to the cache where the requested data is stored.

Furthermore, in this embodiment, if a cache miss occurs, the coherency record may be stored at the cache entry location or a derived cache entry location, depending on whether the cache entry location is found in the corresponding affinity. If the cache entry location is found in the corresponding affinity, the coherency record may be stored at the cache entry location of an affinity corresponding to the cache. On the other hand, if the cache entry location is not found in the corresponding affinity, the coherency record may be stored at a derived cache entry location of the affinity corresponding to the cache.

Alternatively, the specific cache entry location may be selected according to other replacement policies, including, for example, random or pLRU.

The method may end at block 910.

FIGS. 10A-10D are described below, and illustrate the method of FIG. 9 using a partial way-hint replacement policy.

Figure 10A:
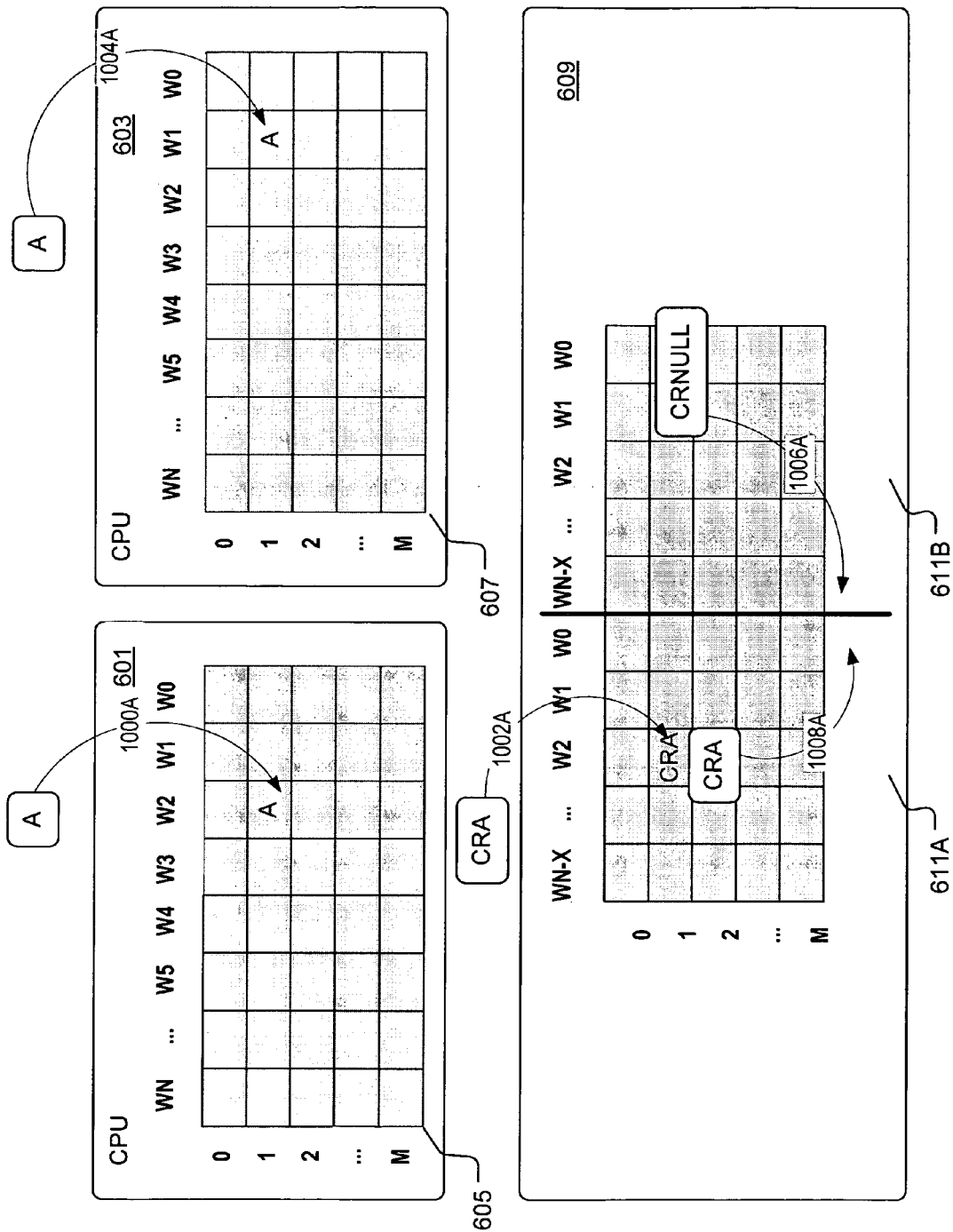
FIGS. 10A-10D are diagrams illustrating a line placement process in accordance with another embodiment.
Figure 10B:
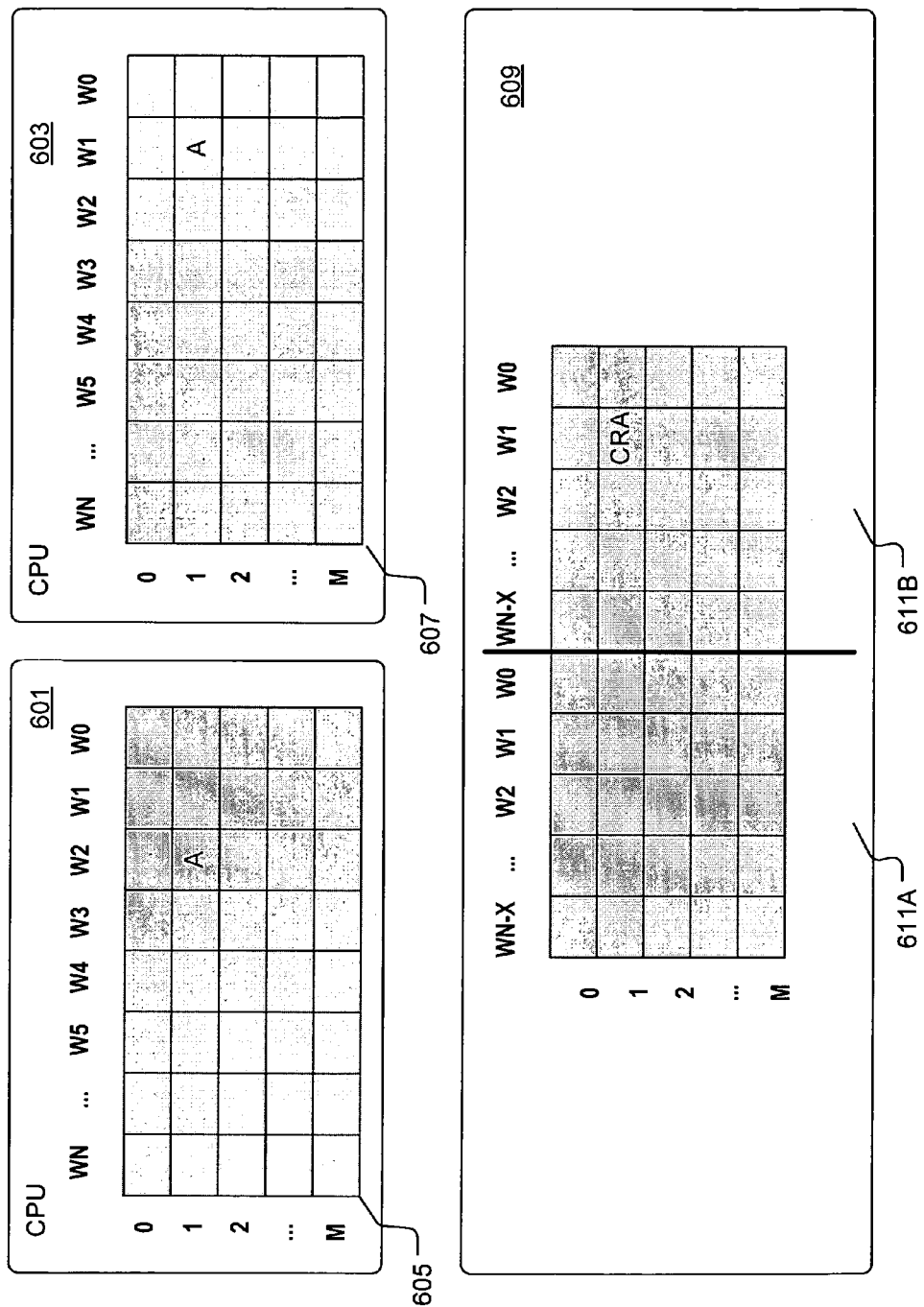
Figure 10C:
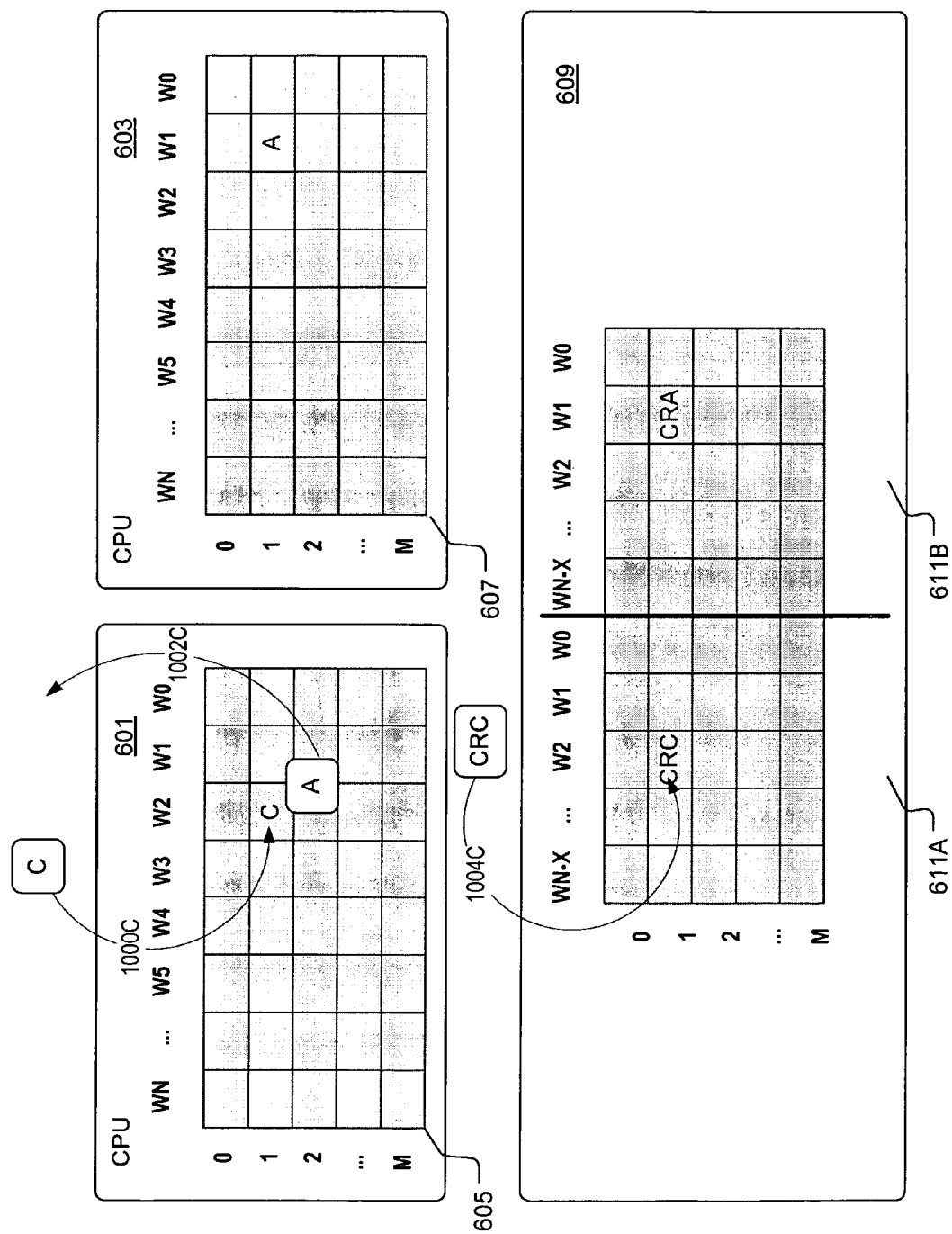

In FIG. 1A, data item A may first be requested by processor 601, and stored in cache entry location represented by set 1, way 2 of processor cache 605 (1000A). Corresponding affinity 611A may be updated by additionally storing coherency record CRA corresponding to data item A at the determined cache entry location of the affinity 611A (1002A). Subsequently, data item A may be requested by processor 603, and stored at cache entry location represented by set 1, way 1 of processor cache 607 (1004A). In this embodiment, affinity 611B corresponding to the cache 607 of the requesting processor 603 may be updated. In this case, since there is a cache hit (i.e., data item A is in cache 605 corresponding to processor 601), the coherency record corresponding to the requested data item may be stored by swapping the coherency record in the affinity corresponding to cache of the processor at the determined cache entry location with the coherency record in the affinity corresponding to the cache of the other processor at the other cache entry location. FIG. 10B illustrates the resulting state of caches 605, 607 and corresponding affinities 611A, 611B.

Figure 10D:
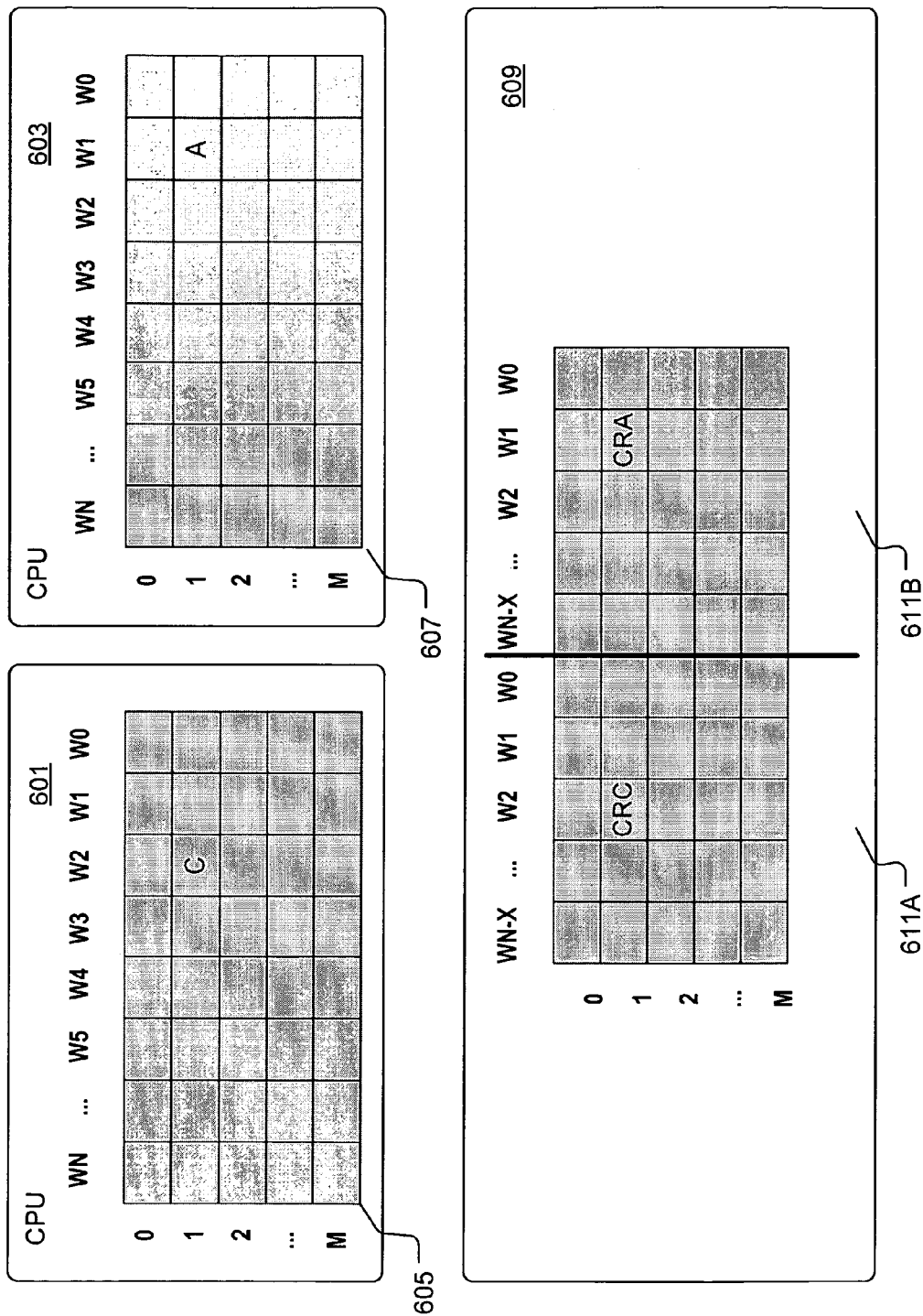

Referring to FIG. 1C, if processor 601 requests data item C, and selects cache entry location represented by set 1, way 2 of processor cache 605 in which to store data item C, then upon a cache miss, data item C may be retrieved from system memory, and stored at the determined cache entry location of processor cache 605 (1000C). Since this cache entry location is occupied (i.e., contains data item A), data item A may be evicted from the cache entry location in the cache 605 (1002C). In this case, however, coherency record CRA does not need to be evicted from the affinity corresponding to cache 605 (i.e., affinity 611A), since coherency record CRA had been migrated to an affinity of the processor that last requested the data item, i.e., processor 603 and corresponding affinity 611B in this example. Consequently, when the last requesting processor 603 subsequently requests data item A (i.e., the processor most likely to request data item A), a cache miss will not result. FIG. 10D illustrates the resulting state of caches 605, 607 and corresponding affinities 611A, 611B.

In FIGS. 10A-10D, the victim (i.e., the way) that is selected in the swapping scheme described in the flowchart of FIG. 9 may be determined based on the partial way-hint replacement policy. However, this swapping scheme is also applicable to other replacement policies including, but not limited to, complete way-hint replacement, random replacement, and pLRU replacement policies.

In one embodiment, the snoop filter and its components are implemented as hardware devices. In another embodiment, these components may be implemented in software (e.g., microcode, assembly language or higher level languages). These software implementations may be stored on a machine-readable medium. A "machine readable" or "machine accessible" medium may include any medium or mechanism that can store or transfer information in a form accessible by a machine (e.g., a computer network device, personal digital assistant manufacturing tool, any device with one or more processors, etc.). Examples of a machine readable or accessible medium include a recordable non-recordable media, such as read only memory (ROM) random access memory (RAM), magnetic storage media, optical storage media, physical storage media, flash memory, or similar medium.

In the foregoing specification, the embodiments of the invention have been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

What is claimed is:

1. A method comprising:
    receiving, at a snoop filter, a request for data from a processor of a plurality of processors;
    determining a cache entry location based, at least in part, on the request;
    storing the data in a cache corresponding to the processor at the cache entry location;
    storing a coherency record corresponding to the data in an affinity corresponding to the cache; and
    determining an occurrence of a cache hit at another cache entry location of another cache corresponding to another processor of the plurality of processors, wherein storing the coherency record corresponding to the data in the affinity is to comprise: storing the data in an affinity corresponding to the cache at a cache entry location selected in accordance with a way-hint replacement policy; and swapping the coherency record in the affinity at the cache entry location with a coherency record in the affinity corresponding to the other cache at the other cache entry location, wherein evicted data is to be temporarily stored in a buffer until an invalidation message is sent to an originating processor to ensure that the requesting processor does not rely on data that was not already invalidated.

2. The method of claim 1, wherein said storing a coherency record corresponding to the data in an affinity corresponding to the cache comprises storing the data in an affinity corresponding to the cache at a randomly selected cache entry location.

3. The method of claim 1, additionally comprising determining the occurrence of the cache miss, and said storing the coherency record in an affinity corresponding to the cache comprises:
    storing the coherency record at the cache entry location of the affinity if the cache entry location is found in the corresponding affinity; and
    storing the coherency record at a derived cache entry location of the affinity if the cache entry location is not found in the corresponding affinity.

4. The method of claim 3, wherein the cache entry location comprises a set and a way.

5. The method of claim 4, wherein said storing the coherency record at a derived cache entry location comprises storing the coherency record at a randomly selected way in the affinity.

6. The method of claim 4, wherein said storing the coherency record at a derived cache entry location comprises calculating a way number.

7. The method of claim 1, further comprising, in response to an occurrence of a cache miss, storing a coherency record corresponding to the data in an affinity corresponding to the cache at the cache entry location of caches corresponding to all other processors of the plurality of processors.

8. The method of claim 1, wherein determining the occurrence of the cache hit at the other cache entry location of the other cache is to correspond to the requesting processor of the plurality of processors.

9. The method of claim 1, wherein the way-hint replacement policy is complete or partial.

10. The method of claim 1, further comprising migrating the coherency record in the affinity corresponding to the cache of the requesting processor to the affinity corresponding to the cache where the requested data is stored.

11. An apparatus comprising:
    a hardware snoop filter operable to:
        receive a request for data from a processor of a plurality of processors;
        determine a cache entry location based, at least in part, on the request;
        store the data in a cache corresponding to the processor at the cache entry location;
        store a coherency record corresponding to the data in an affinity corresponding to the cache; and
        determine an occurrence of a cache hit at another cache entry location of another cache corresponding to another processor of the plurality of processors, wherein storing the coherency record corresponding to the data in the affinity is to comprise: storing the data in an affinity corresponding to the cache at a cache entry location selected in accordance with a way-hint replacement policy and swapping the coherency record in the affinity at the cache entry location with a coherency record in the affinity corresponding to the other cache at the other cache entry location, wherein evicted data is to be temporarily stored in a buffer until an invalidation message is sent to an originating processor to ensure that the requesting processor does not rely on data that was not already invalidated.

12. The apparatus of claim 11, wherein said snoop filter stores a coherency record corresponding to the data in an affinity corresponding to the cache by storing the data in an affinity corresponding to the cache at a randomly selected cache entry location.

13. The apparatus of claim 11, the snoop filter additionally operable to determine the occurrence of the cache miss, and said snoop filter stores the coherency record in an affinity corresponding to the cache by:
  storing the coherency record at the cache entry location of the affinity if the cache entry location is found in the corresponding affinity; and
  storing the coherency record at a derived cache entry location of the affinity if the cache entry location is not found in the corresponding affinity.

14. The apparatus of claim 13, wherein the cache entry location comprises a set and a way, and said snoop filter stores the coherency record at a derived cache entry location by calculating a way number.

15. The apparatus of claim 11, further comprising a controller device to comprise the snoop filter, wherein the controller device is to couple the plurality of processors to a system memory and is to manage movement of data between the plurality of processors and the system memory.

16. A system comprising:
  an SRAM (static random access memory);
  a plurality of processors coupled to the SRAM; and
  a chipset coupled between the plurality of processors and the SRAM, the chipset including a snoop filter operable to access data from the SRAM and to:
    receive a request for data from a processor of a plurality of processors;
    determine a cache entry location based, at least in part, on the request;
    store the data in a cache corresponding to the processor at the cache entry location;
    store a coherency record corresponding to the data in an affinity corresponding to the cache; and
    determine an occurrence of a cache hit at another cache entry location of another cache corresponding to another processor of the plurality of processors, wherein storing the coherency record corresponding to the data in the affinity is to comprise: storing the data in an affinity corresponding to the cache at a cache entry location selected in accordance with a way-hint replacement policy and swapping the coherency record in the affinity at the cache entry location with a coherency record in the affinity corresponding to the other cache at the other cache entry location, wherein evicted data is to be temporarily stored in a buffer until an invalidation message is sent to an originating processor to ensure that the requesting processor does not rely on data that was not already invalidated.

17. The system of claim 16, the snoop filter additionally operable to determine the occurrence of the cache miss, and said snoop filter stores the coherency record in an affinity corresponding to the cache by:
  storing the coherency record at the cache entry location of the affinity if the cache entry location is found in the corresponding affinity; and
  storing the coherency record at a derived cache entry location of the affinity if the cache entry location is not found in the corresponding affinity.

18. The system of claim 17, wherein the cache entry location comprises a set and a way, and said snoop filter stores the coherency record at a derived cache entry location by calculating a way number.

19. The system of claim 16, wherein the chipset is to manage movement of data between the plurality of processors and the SRAM.

20. A non-transitory machine-accessible medium having stored thereon instructions, the instructions when executed by a machine, result in the following:
  receiving, at a snoop filter, a request for data from a processor of a plurality of processors;
  determining a cache entry location based, at least in part, on the request;
  storing the data in a cache corresponding to the processor at the cache entry location;
  storing a coherency record corresponding to the data in an affinity corresponding to the cache; and
  determining an occurrence of a cache hit at another cache entry location of another cache corresponding to another processor of the plurality of processors, wherein storing the coherency record corresponding to the data in the affinity is to comprise: storing the data in an affinity corresponding to the cache at a cache entry location selected in accordance with a way-hint replacement policy and swapping the coherency record in the affinity at the cache entry location with a coherency record in the affinity corresponding to the other cache at the other cache entry location, wherein evicted data is to be temporarily stored in a buffer until an invalidation message is sent to an originating processor to ensure that the requesting processor does not rely on data that was not already invalidated.

21. The medium of claim 20, additionally comprising determining an occurrence of a cache miss, and said storing the coherency record in an affinity corresponding to the cache comprises:
  storing the coherency record at the cache entry location of the affinity if the cache entry location is found in the corresponding affinity; and
  storing the coherency record at a derived cache entry location of the affinity if the cache entry location is not found in the corresponding affinity.

22. The medium of claim 21, wherein the cache entry location comprises a set and a way, and wherein said storing the coherency record at a derived cache entry location comprises calculating a way number.

* * * * *